2 Sheets--Sheet 1.

R. DUTTON.
Cutting Apparatus for Harvesters.

No. 157,590. Patented Dec. 8, 1874.

Witnesses:
E. C. Davidson
Baltis De Long

Inventor:
Rufus Dutton
by his Atty
Wm D. Baldwin

2 Sheets--Sheet 2.
R. DUTTON.
Cutting Apparatus for Harvesters.
No. 157,590. Patented Dec. 8, 1874.
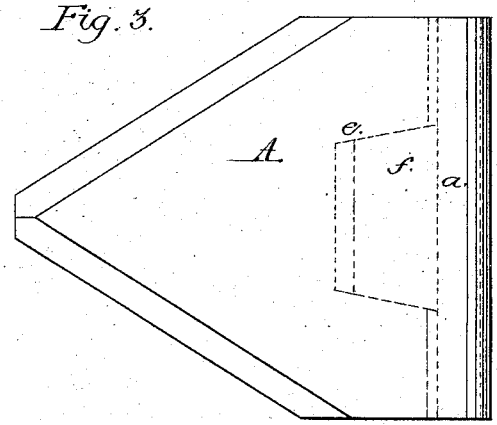
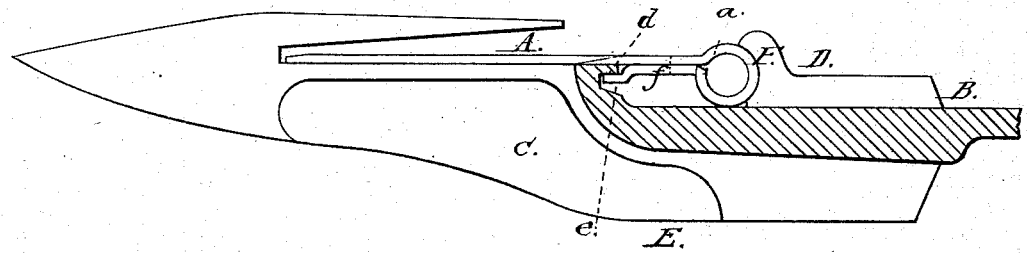
Witnesses:
Henry P. Sisson
Wm. P. Fitch
Rufus Dutton
Inventor:

UNITED STATES PATENT OFFICE.

RUFUS DUTTON, OF YONKERS, NEW YORK.

IMPROVEMENT IN CUTTING APPARATUS FOR HARVESTERS.

Specification forming part of Letters Patent No. 157,590, dated December 8, 1874; application filed October 7, 1874.

*To all whom it may concern:*

Be it known that I, RUFUS DUTTON, of Yonkers, in the county of Westchester and State of New York, have invented certain new and useful Improvements in the Cutting Apparatus of Harvesters, of which the following is a specification:

The objects of my invention are to construct a cutting apparatus for harvesters, the sections, blades, or cutters of which may readily be removed from or placed upon the cutter-bar, knife-back, or sickle-back, to hold the cutters closely down to the surface of the slots of the guards over which they slide.

The subject-matter claimed is hereinafter specified.

Figure 1:
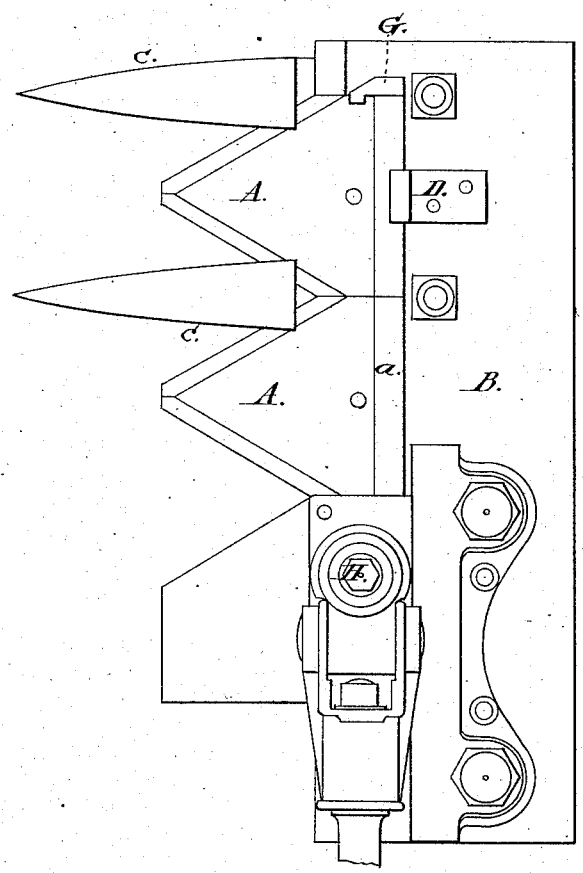
Figure 2:
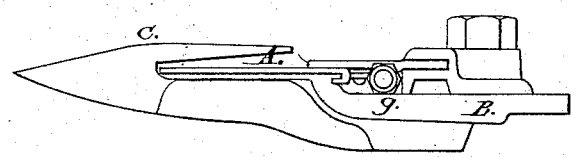

Figure 1 represents a plan view of so much of my improved cutting apparatus as is necessary to illustrate the invention herein claimed, and Fig. 2 an end view of the same. Fig. 3 shows a view, on an enlarged scale, of one of the sections detached, and Fig. 4 an enlarged sectional view of the cutting apparatus.

The finger-beam B is, by preference, made of metal, and is turned up at its front edge and provided with lugs, or a flange or cross-bar, d, which forms a lip on the back edge of this turned-up portion of the finger-beam, for a purpose presently specified. Guards C, of well-known construction, are secured to the finger-beam in any of the usual well-known ways. The sections A are, by preference, formed with an eye, a, at their backs. A spring-tongue, f, on the under side of each section, has a downward bend given it in front, so as to form a lug, e, which interlocks with the flange d on the finger-bar or the cross-bar, and thus holds the cutter securely down upon the guard, while leaving it free to move endwise. The cutters are slipped upon a knife-bar, F, and secured thereon by a nut, which mode of construction renders them readily removable or replaceable, and yet holds them securely when at work. I have in this instance shown the knife-bar as round, but obviously it might be made polygonal in cross-section. The eyes or loops of the sections might also be correspondingly varied in shape. The backs of the cutter-eyes abut against back rests or guides D on the finger-beam, which hold the cutters up to their work and keep the interlocking parts in position. The sections are secured upon the bar by a nut, g, polygonal in cross-section, and so arranged relatively to the finger-beam that, while free to slide over it as the cutters reciprocate, it cannot be turned or unscrewed from the knife-bar without drawing the pitman-head out of its guides. The sections are thus securely held upon the knife-bar, and yet can easily be removed or replaced. The outer knife or section abuts against a stop, G, on the bar, to hold it in place.

By holding down each section (independently of the knife-back or buttons) to the under surface of the slot of the finger, I not only secure a close shear-cut, but am able to make a detachable or removable section, which can be made to slide loosely over the knife-back and still not injure the effective working of the knife. The section being made to slide loosely over the knife-back, its free removal will not be obstructed by rust or dirt, and, being also held down from the under side and back of the cross-bar, it will not become clogged by bits of grass or dirt.

In the cutting apparatus of a harvester, I claim—

1. A cutter or knife section, constructed substantially as set forth, with a lug or other equivalent locking device attached directly to or forming part of the section itself in advance of its point of attachment to the cutter-bar, to hold the cutter close to the guards across which it cuts.

2. The combination, substantially as specified, of a knife-bar, a series of removable sections secured thereon, lugs or their equivalents on the sections, and a corresponding lock-flange on the finger-beam or stationary part secured thereto, to cause the sections to work close to the surface of the slots in the guards over which they slide.

3. The combination, substantially as set forth, of a cutter-bar, a series of cutters secured thereon, locking-lugs on the cutters, a corresponding flange on the finger-beam or stationary part secured thereto, and back-rests to hold the locking parts in position.

In testimony whereof I have hereunto subscribed my name.

RUFUS DUTTON.

Witnesses:
  JOS. T. K. PLANT,
  JOS. I. PEYTON.